Patented Feb. 25, 1930

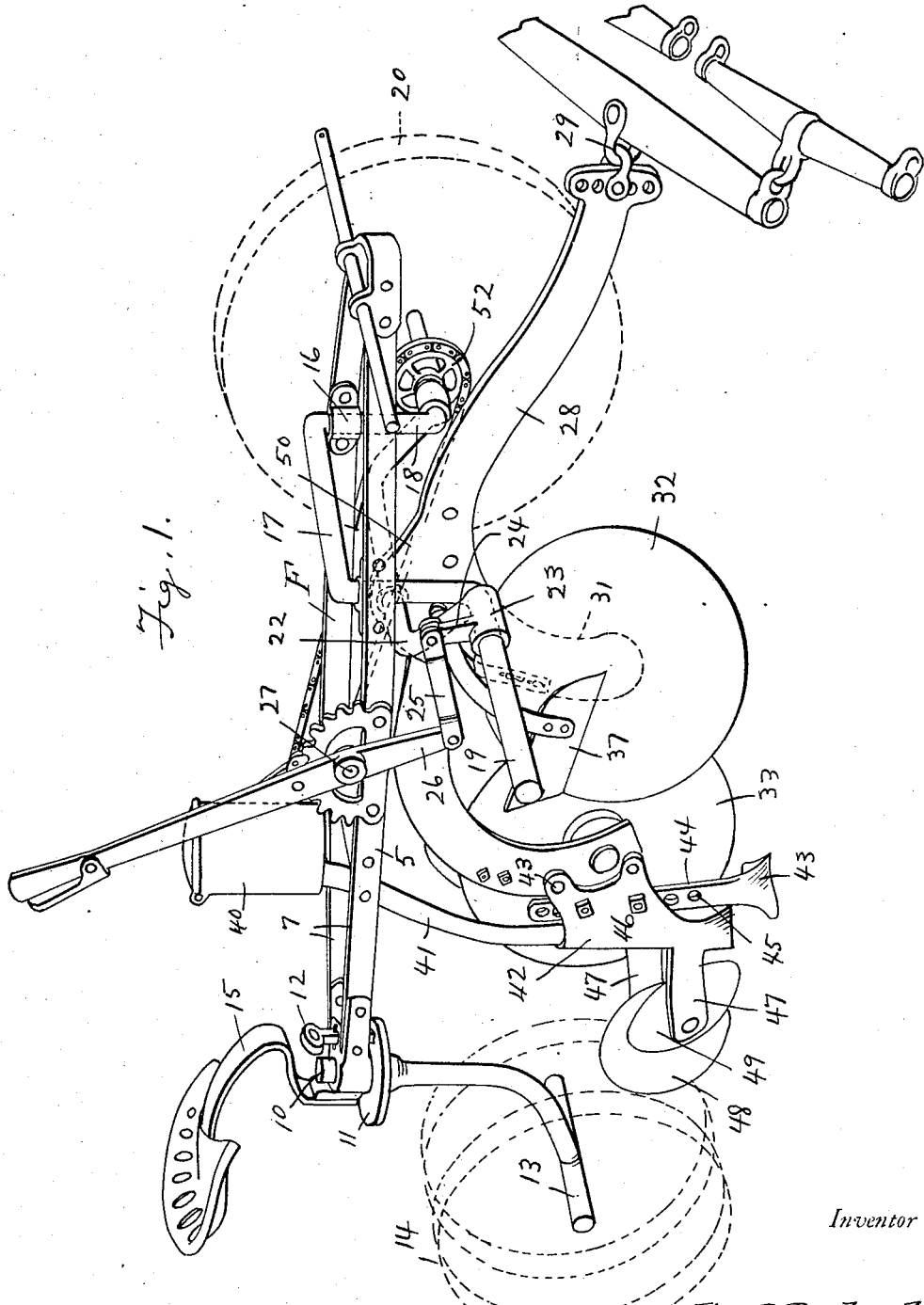

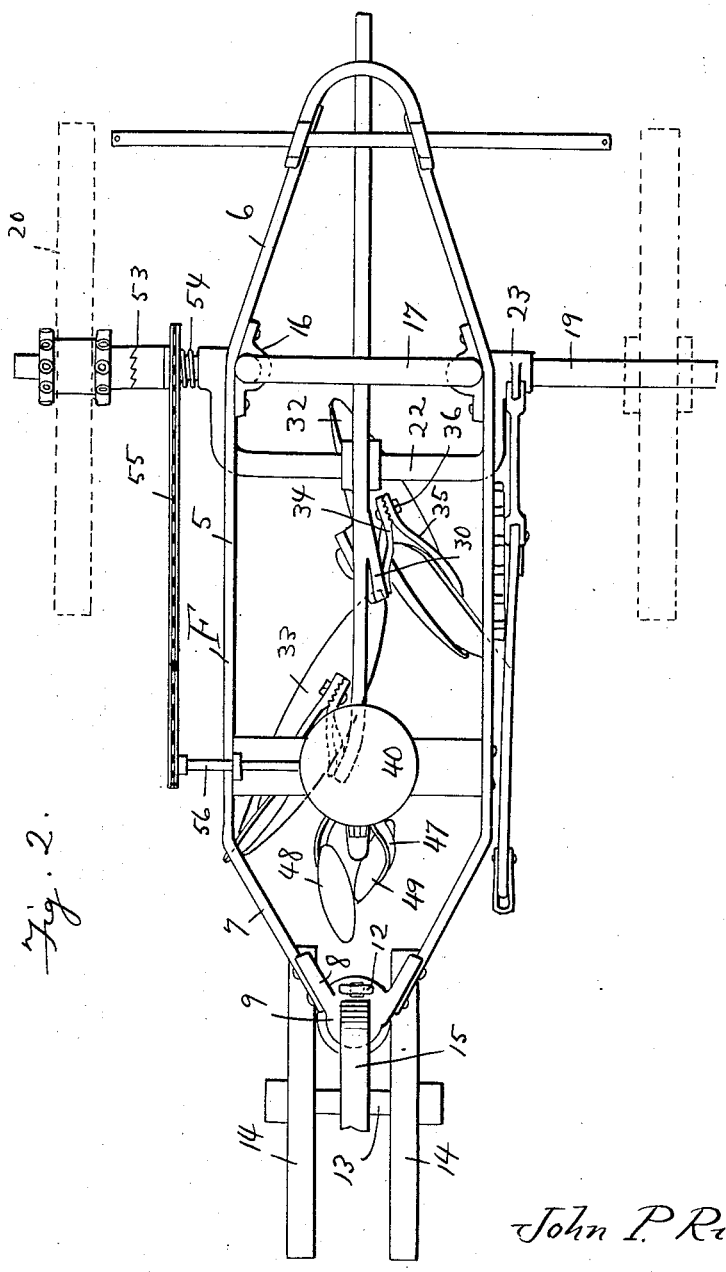

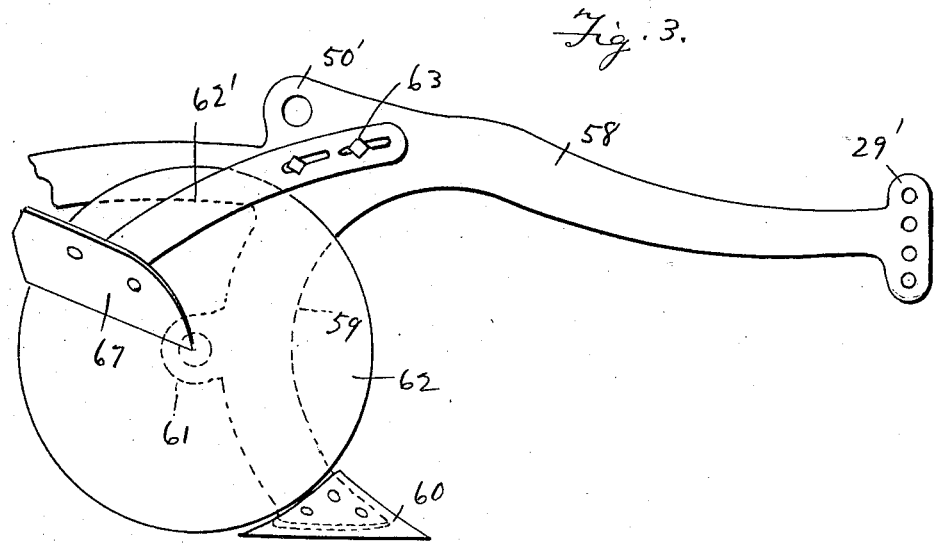
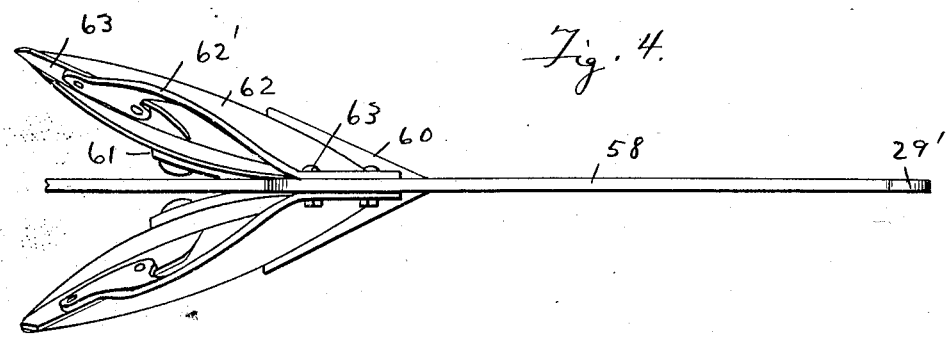

1,748,308

UNITED STATES PATENT OFFICE

JOHN P. RICHARD, OF SPRINGFIELD, COLORADO

COMBINATION AGRICULTURAL MACHINE

Application filed September 12, 1927. Serial No. 219,036.

The present invention relates to an agricultural machine and has for its prime object to provide an apparatus of this nature which provides a means for digging a furrow and further digging the subsoil and planting corn therein and then covering the subsoil leaving the ground in a cultivated condition for the best efficiency in growing the corn.

A still further important object of the invention resides in the provision of a combined structure of this nature wherein the parts are arranged in an exceedingly compact and convenient manner.

A still further important object of the invention resides in the provision of a machine of this nature which is comparatively simple in its construction, strong and durable, easy to manipulate and adjust, and thoroughly efficient and reliable in its operation and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:—

Figure 1 is a fragmentary perspective view of the machine embodying the features of my invention, Figure 2 is a top plan view thereof.

Figure 3 is a side elevation of the digging unit,

Figure 4 is a top plan view thereof, and,

Figure 5 is a sectional view through the furrow formed by this machine after the corn is planted.

Referring to the drawing in detail, it will be seen that the letter F denotes a frame comprising side bars 5 having inwardly directed forward ends 6 and inwardly directed rear ends 7. The rear ends 7 are attached to the arms 8 of a sleeve 9 which receives the upper end of a standard 10 and rests on a flange 11 on the standard which is provided with an aperture so that a pin 12 extending through the sleeve may be inserted therethrough to prevent the turning of the standard 10. The standard 10 at its lower end is curved rearwardly and has axle extensions 13 laterally disposed on which are journaled wheels 14. A seat 15 is mounted on the flange 11. Bearing brackets 16 are mounted on the side bars 5 adjacent the ends 6. A crank shaft axle has the intermediate portion thereof offset as at 17 by means of arms 18 which extend through the brackets 16 and the lower ends thereof terminate in the stub axles 19 extending outwardly therefrom and on which are journaled wheels 20 which are the front wheels of the machine and are much larger in diameter than the wheels 14.

A U-shaped member 22 terminates in sleeves 23 journaled on the stub axles 19 adjacent the arms 18 and a crank 24 extends from one of the sleeves 23 and has a link 25 engaged therewith and also engaged with the lower end of a lever 26. This lever 26 is pivoted on one side bar as at 27 and may be swung to adjust the U-shaped member 22 for a purpose which will appear later. A plow beam 28 is provided with draft hitch means 29 at the forward ends thereof and the rear portion of this shank has a rearwardly and outwardly diverging arm 30 while the rear end thereof is curved outwardly and rearwardly in the opposite direction. An extension 31 is provided intermediate the ends of the beam 28 and has journaled thereon a disk 32 disposed diagonally of the machine. The rear extremity of the beam curves downwardly as is shown clearly in Figure 1 and another disk 33 is journaled on the end thereof diagonal to the machine and diagonal to the first disk 32 for digging a furrow as the machine progresses along. An arm 34 is engaged on the arm 30 and is directed forwardly and has pivoted thereto another arm 35 with suitable means 36 to hold the arm 35 in different adjusted positions in respect to the arm 34. The arm 35 has on its extremity a scraper 37 for cooperation with the disk 32. A similar arrangement is provided for supporting another scraper in respect to the disk 33 as will be apparent from an inspection of Figure 2.

A seed box 40 is mounted on the frame and has a conduit 41 leading downwardly therefrom to a boot 42 which is fixed as at 43 to the lower rear end of the beam 28. A subsoil digger 43 has an adjustable connection with the planter boot 42 by means of a shank 44 provided with a plurality of apertures 45 for engagement with bolts 46. Arms 47 project rearwardly from the planter boot 42 and have disks 48 and 49 thereon the latter being disposed forwardly of the former and obliquely thereto, these disks 48 and 49 being arranged also obliquely to the frame for covering the seeds which are planted in the subsoil dug by the subsoil digger 43, yet leaving a furrow as is shown in Figure 5.

The beam 28 is provided intermediate its ends with a raised portion 50 having an opening through which the bight of the U-shaped member 22 projects so that the beam may be raised and lowered by the manipulation of the lever 26 as will now be quite apparent. When the apparatus is to be guided the pin 12 is released from the flange 11. A sprocket 52 is journalled on one of the stub axles 19 and has a ratchet engagement as at 53 with one of the wheels 20 being spring pressed as at 54. A chain 55 is trained over the sprocket 52 and operates the planter box 40 through a shaft 56.

In Figures 3 and 4 another embodiment of the plow beam has been shown at 58 having a hump 50' apertured to receive the bight of the member 22 and having the draft connecting means 29' at the forward end. An arm extends downwardly from the beams 58 as at 59 and terminates in a plow element 60. Rearwardly diverging extensions 61 are provided on the arm 59 and has journaled thereon discs 62 which diverge rearwardly from each other and are disposed obliquely to the plow beam. Rods 62 have pin and slot engagements 63 with the beam 58 and support scrapers 63 for cooperation with the disks 62.

It is thought that the construction, operation, utility, and advantages of this invention will now be quite apparent to those skilled in this art without a more detailed description thereof. The present embodiment of the invention has been disclosed in detail merely by way of example since in actual practice it attains the features of advantage enumerated as desirable in the statement of the invention and the above description.

It will be apparent that the structure is simple, and the parts thereof are arranged in a compact and convenient manner for ready manipulation and to attain the maximum efficiency. It is to be understood, however, that changes in the details of construction, and in the combination and arrangement of parts may be resorted to without departing from the spirit or scope of the invention as hereinafter claimed or sacrificing any of its advantages.

Having thus described my invention, what I claim as new is:—

In combination, a wheeled frame, an inverted U-shaped member having its sides fixed to the frame so that the bight thereof extends transversely of the frame, the ends of the member merging into outwardly directed axles, a second U-shaped member having its ends terminating in sleeves rockable on the axles, said axles being adapted to receive the wheels of the wheeled frame, a plow beam having its intermediate portion engaged with the bight of the said second U-shaped member, an arm depending downwardly from an intermediate portion of the plow beam, and the rear end of the plow beam being bent downwardly, discs journaled on the extremities of the arms and downturned end of the beam respectively, adjustable means for scraping the disc, a lever rockable on the frame, and a link connecting the lever with one side of the said second U-shaped member.

In testimony whereof I affix my signature.

JOHN P. RICHARD.